United States Patent [19]

Yoshino

[11] Patent Number: 5,016,979
[45] Date of Patent: May 21, 1991

[54] ANTI-GLARE INSIDE REARVIEW MIRROR ASSEMBLY FOR MOTOR VEHICLE

[75] Inventor: Kunio Yoshino, Saitama, Japan
[73] Assignee: Kabushiki Kaisha Matsuyama Seisakusho, Tokyo, Japan
[21] Appl. No.: 531,514
[22] Filed: May 30, 1990
[30] Foreign Application Priority Data May 31, 1989 [JP] Japan .................. 1-63579[U]

[51] Int. Cl.$^5$ .................. B60R 1/04; G02B 5/08
[52] U.S. Cl. .................. 350/281
[58] Field of Search .................. 350/279, 281

[56] References Cited

U.S. PATENT DOCUMENTS 4,836,648  6/1989  Niwayama .................. 350/281

FOREIGN PATENT DOCUMENTS

1780669  8/1979  Fed. Rep. of Germany .
50-6107  2/1975  Japan .
58-51633  11/1983  Japan .

Primary Examiner—Ian J. Lobo
Attorney, Agent, or Firm—Irving M. Weiner; Joseph P. Carrier; Pamela S. Burt

[57] ABSTRACT

An anti-glare inside rearview mirror assembly for use in a motor vehicle includes a support having one end fixed to a motor vehicle body and including a spherical body on the other end, a bracket having a recess engaging at least a portion of the spherical body, a clamping member for clamping the spherical body in cooperation with the bracket, a housing accommodating the bracket therein, the housing having an upper wall, a lower wall, an open front wall, and a rear wall, a mirror mounted in the open front wall of the housing, and an angle adjusting member for adjusting the angle of the housing with respect to the bracket. A tool such as a screwdriver may be easily inserted through a hole defined in the lower wall of the housing to adjust the force with which the spherical body is clamped by the clamping member in cooperation with the bracket.

6 Claims, 7 Drawing Sheets

ANTI-GLARE INSIDE REARVIEW MIRROR ASSEMBLY FOR MOTOR VEHICLE

BACKGROUND OF THE INVENTION

1. Field of the Invention:

The present invention relates to an anti-glare rearview mirror assembly for use in the passenger's compartment of a motor vehicle, and more particularly to an anti-glare inside rearview mirror assembly for reflecting, toward the driver, a reduced intensity of light from the headlamps of a motor vehicle running behind the driver's vehicle.

2. Description of the Related Art:

Some inside rearview mirror assemblies for motor vehicles incorporate an anti-glare mechanism which allows the mirror itself to be tilted into a position to reduce the reflection of light from headlamps of a running vehicle behind the driver's vehicle.

Typically, such an anti-glare inside rearview mirror assembly comprises a bracket mounted on a stay extending from a motor vehicle body, a housing swingably attached to the bracket, an anti-glare mirror supported in the housing, and a tilting mechanism for tilting the housing with respect to the bracket. In use, the tilting mechanism is operated to tilt the housing with respect to the bracket for angularly moving the mirror from a normal position into an anti-glare position, so that the reflection of light from the headlamps of a motor vehicle running behind the driver's vehicle is reduced in intensity. Therefore, the driver is not dazzled by the light reflected by the anti-glare mirror.

The angle of the anti-glare inside rearview mirror assembly with respect to the bracket in the normal position varies from driver to driver because of different physical conditions of drivers. For this reason, the anti-glare inside rearview mirror is usually equipped with an angle adjusting mechanism which is positioned between the stay and the bracket for varying the mirror angle so as to best match any driver.

One known angle adjusting mechanism is disclosed in Japanese Utility Model Publication No. 50(1975)-6107, for example. The disclosed angle adjusting mechanism includes a conical tube extending rearwardly behind a mirror housing which holds a mirror, and a swingable member fitted in the tube. A spherical body on the distal end of a stay is inserted in the swingable member. The angle of an anti-glare mirror is adjusted when the mirror housing is gripped and angularly moved to swing the swingable member with respect to the spherical body.

The force with which any adjusted mirror angle is kept in a given position, i.e., the resistance to the swinging movement of the swingable member with respect to the spherical body, is adjustable. More specifically, the disclosed angle adjusting mechanism includes a nut threaded over the distal end of the tube. When the nut is turned, the swingable member moves in the conical tube to vary the force with which the swingable member is held relatively to the spherical body, so that the force with which the adjusted mirror angle is kept in position is adjusted.

To adjust the force with which the adjusted mirror angle is kept in position, therefore, the nut on the rear of the mirror housing has to be turned. However, the nut on the rear of the mirror housing is not readily accessible by the drive and hence cannot easily be manipulated.

Japanese Utility Model Publication No. 58(1983)-51633 discloses an inside rearview mirror assembly which includes a mirror housing having a receiver frame extending rearwardly from the rear surface of the mirror housing, and a screw mounted on a lower surface of the receiver frame. The force with which any adjusted angle mirror is kept in position can be adjusted by turning the screw. Since the screw is directed downwardly and can be easily accessed from below, it can be turned more easily than the nut disclosed in Japanese Utility Model Publication No. 50(1975)-6107. The receiver frame which extends rearwardly from the rear of the mirror housing, however, makes the inside rearview mirror assembly thick in its transverse direction (i.e., the fore-and-aft direction of the motor vehicle). Accordingly, the disclosed arrangement does not lend itself to incorporation into an anti-glare inside rearview mirror whose mirror housing is inherently thick on account of a mirror tilting mechanism housed therein.

SUMMARY OF THE INVENTION

It is an object of the present invention to provide an anti-glare inside rearview mirror assembly for motor vehicles which includes a mirror housing and a mirror that can easily be adjusted in angle from outside of the rearview mirror assembly.

According to the present invention, there is provided an anti-glare inside rearview mirror assembly for use in a motor vehicle having a motor vehicle body, comprising a support adapted to extend from the motor vehicle body and including a spherical body at one end thereof, bracket means having a recess engaging at least a portion of the spherical body, clamping means for clamping the spherical body in cooperation with the bracket means, a housing accommodating the bracket means therein, the housing having an upper wall, a lower wall, an open front wall, and a rear wall, a mirror mounted in the open front wall of the housing, and angle adjusting means for adjusting the angle of the housing with respect to the bracket. The housing has at least one hole defined in the lower wall for insertion of a tool therethrough to adjust the force with which the spherical body is clamped by the clamping means in cooperation with the bracket means.

The above and further objects, details and advantages of the present invention will become apparent from the following detailed description of preferred embodiments thereof, when read in conjunction with the accompanying drawings.

DESCRIPTION OF THE PREFERRED EMBODIMENTS

Figure 1:
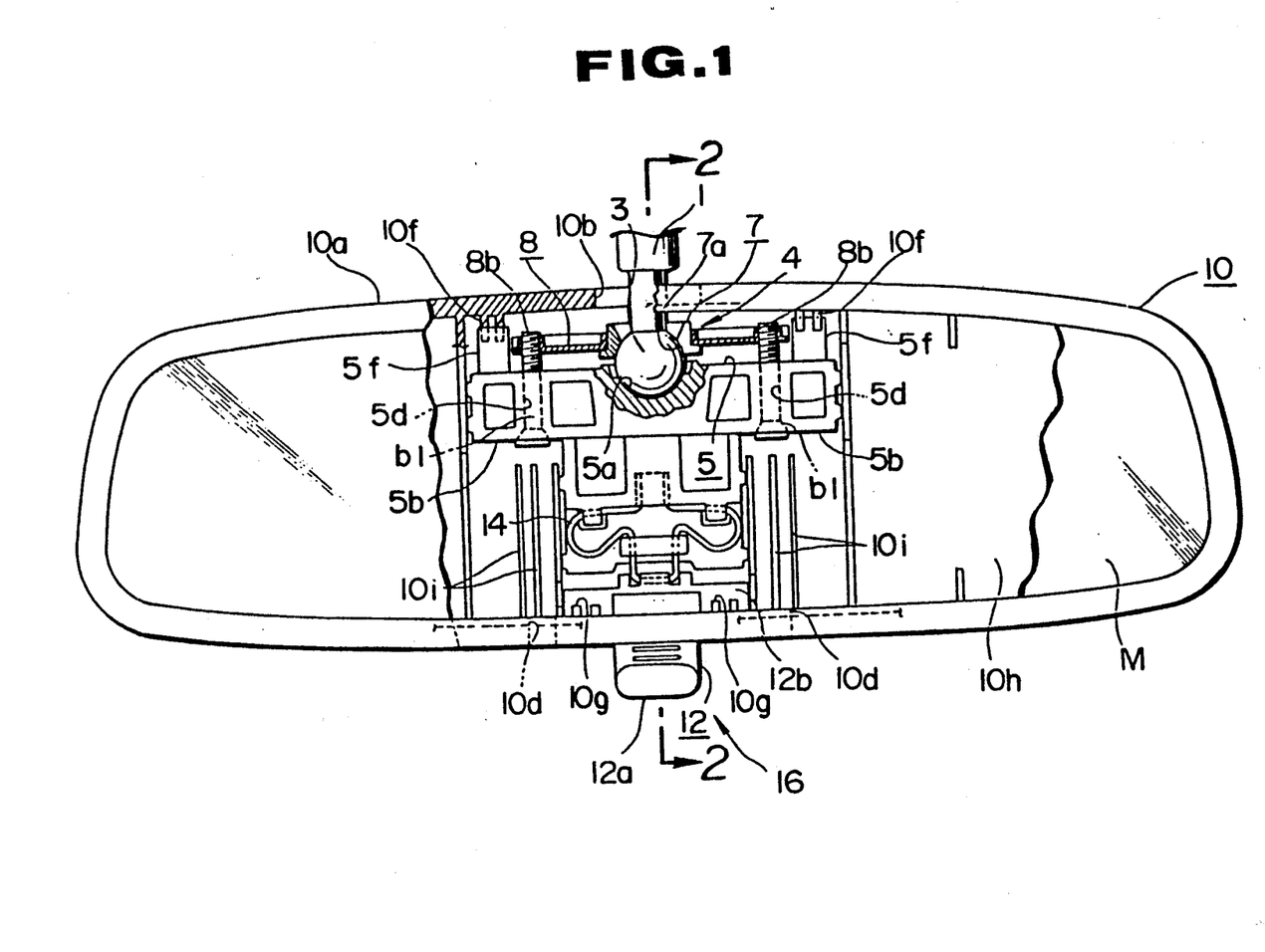
FIG. 1 is a front elevational view, partly cut away, of an anti-glare inside rearview mirror assembly for a motor vehicle according to an embodiment of the present invention.
Figure 2:
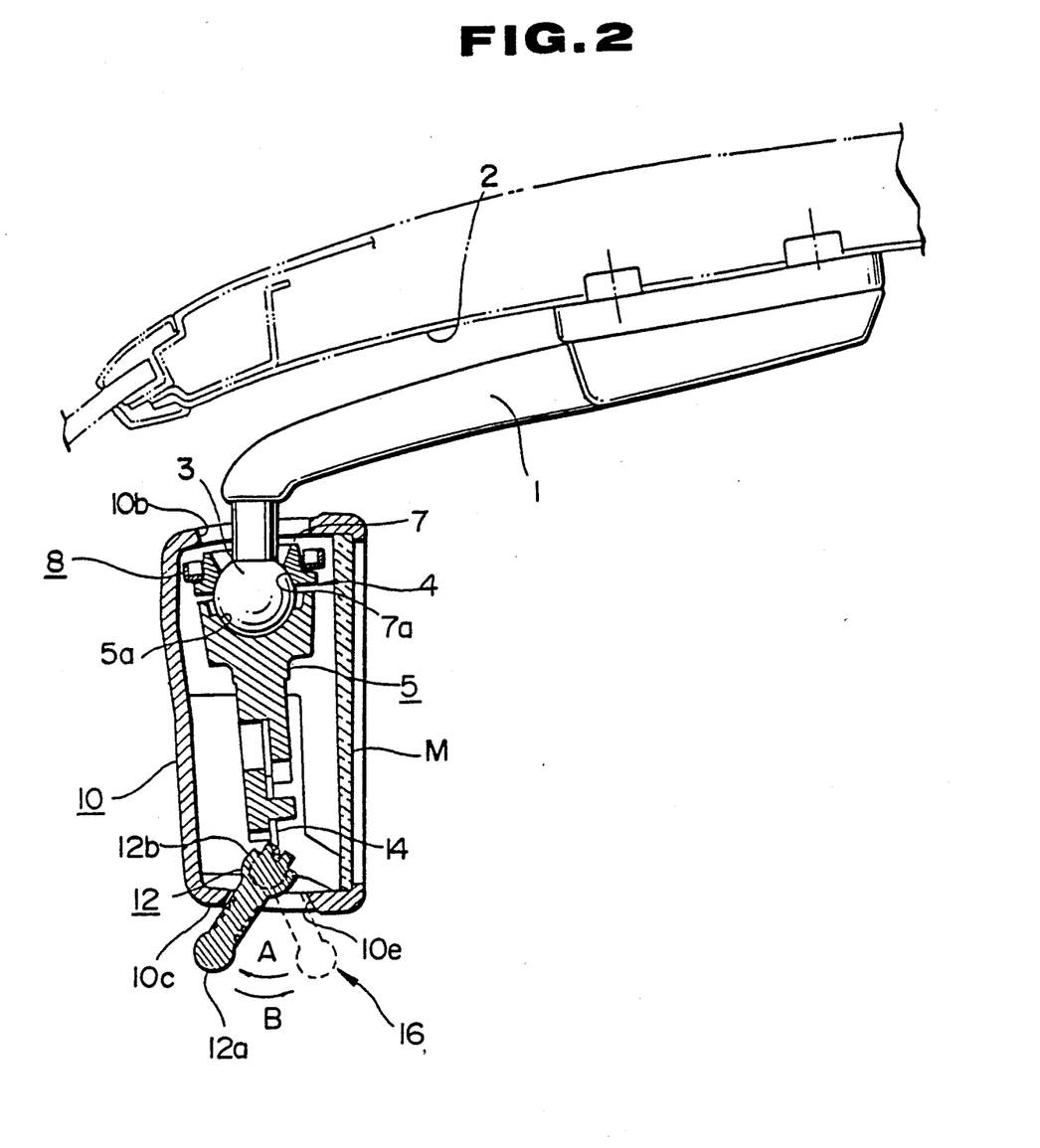
FIG. 2 is a cross-sectional view taken along line 2—2 of FIG. 1.
Figure 3:
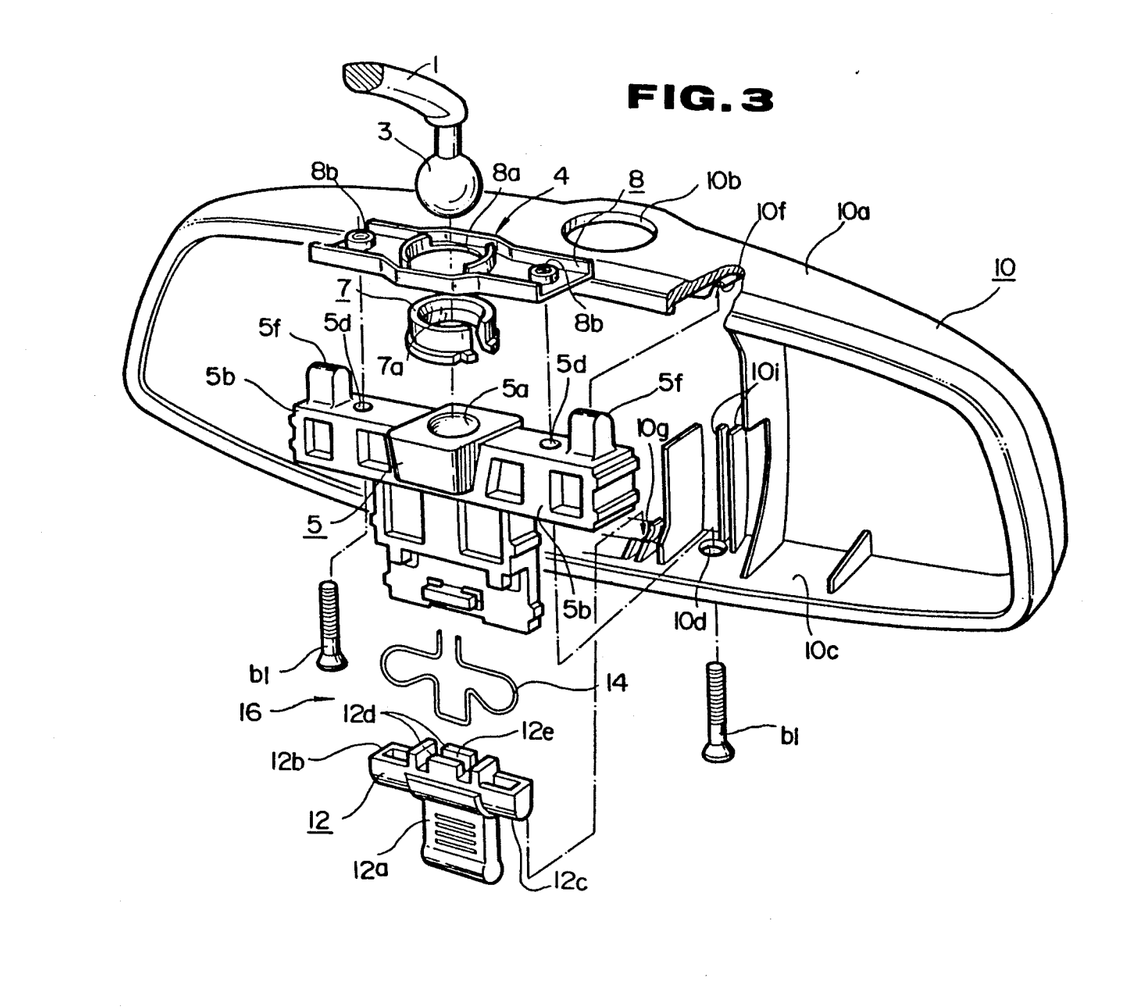
FIG. 3 is an exploded perspective view of the anti-glare inside rearview mirror assembly shown in FIG. 1.

As shown in FIGS. 1 through 3, an anti-glare inside rearview mirror assembly according to an embodiment of the present invention is mounted on a stay 1 fixed to a ceiling 2 of the passenger's compartment of a motor vehicle. The stay 1 has a front end portion extending downwardly and terminating in a spherical body 3 integrally formed with the lower end thereof. The anti-glare inside rearview mirror assembly has a bracket 5 which is mounted on the spherical body 3 through an angle adjusting mechanism 4.

Figure 4:
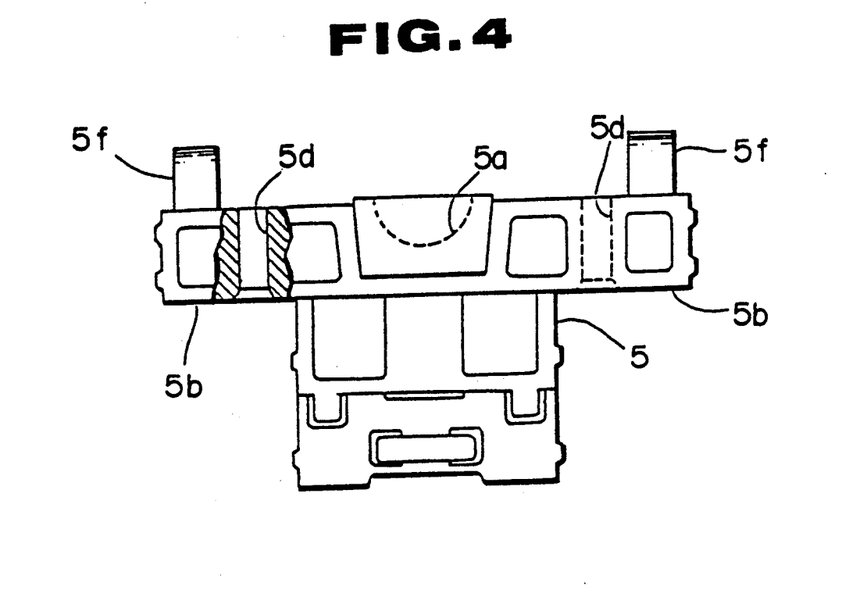
FIG. 4 is a front elevational view of a bracket.
Figure 5:
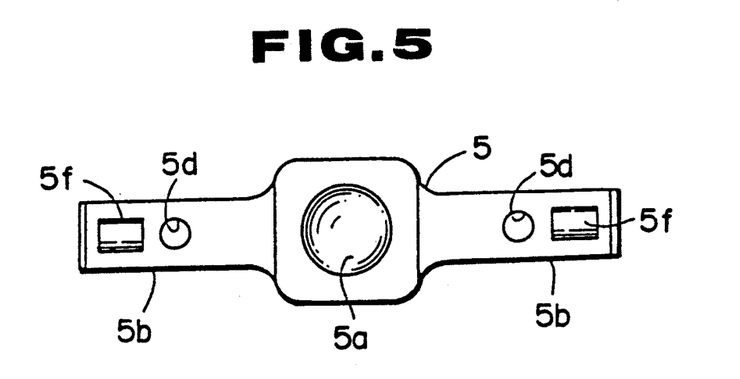
FIG. 5 is a plan view of the bracket.

As illustrated in FIGS. 4 and 5, the bracket 5 has a hemispherical receiver recess 5a defined in an upper surface thereof and a pair of extension arms 5b extending away from each other transversely across an upper portion of the bracket 5. The extension arms 5b have vertical through holes 5d defined respectively therein, and also have respective fingers 5f disposed on upper surfaces thereof outwardly of the holes 5d and extending upwardly, the fingers 5f having round upper tip ends.

A cap 7 is mounted on an upper portion of the spherical body 3, and a holder plate 8 is fitted over the cap 7. The cap 7, the holder plate 8, the spherical body 3, and the receiver recess 5a jointly constitute the angle adjusting mechanism 4.

Figure 6:
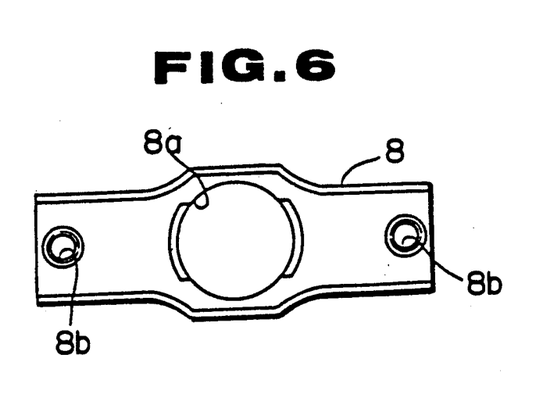
FIG. 6 is a plan view of a holder plate.
Figure 7:
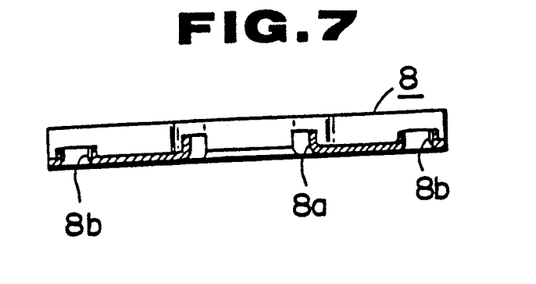
FIG. 7 is a vertical cross-sectional view of the holder plate.

As shown in FIGS. 6 and 7, the holder plate 8 has a widened central region with a circular hole 8a defined therein. The holder plate 8 also has a pair of threaded holes 8b for receiving respective bolts, the threaded holes 8b being defined near respective ends of the holder plate 8.

Figure 8:
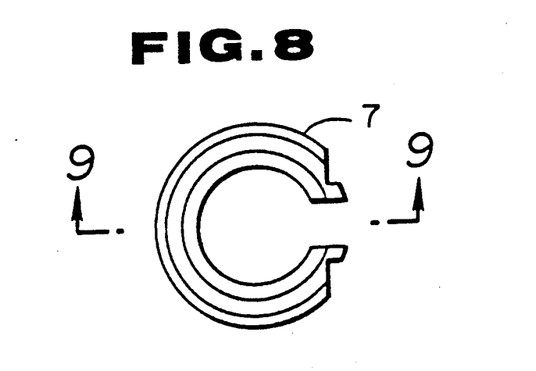
FIG. 8 is a plan view of a cap.
Figure 9:
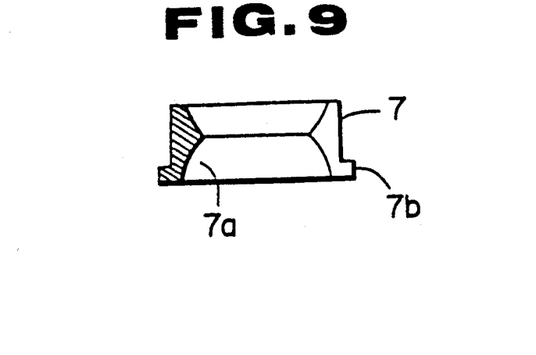
FIG. 9 is a cross-sectional view taken along line 9—9 of FIG. 8.

As shown in FIGS. 8 and 9, the cap 7 is of an annular shape which is partly cut off. The cap 7 has an outer circumferential surface which is engaged by the inner circumferential surface of the hole 8a (FIGS. 6 and 7) in the holder plate 8. The cap 7 has a receiver recess 7a defined in a lower portion of the inner circumferential surface thereof and opening downwardly, and a flange 7b extending radially outwardly from the lower end of the outer circumferential surface thereof. The flange 7b supports thereon a lower surface of the holder plate 8 around the hole 8a.

The angle adjusting mechanism 4 is assembled as follows: As shown in FIGS. 1 and 2, the lower portion of the spherical body 3 is placed in the receiver recess 5a, and the cap 7 is placed on the upper portion of the spherical body 3. Bolts b1 are inserted respectively through the holes 5d in the bracket 5, from below, and then threaded into the threaded holes 8b in the holder plate 8. The bolts b1 are continuously turned to move the holder plate 8 downwardly thereby displacing the cap 7 toward the bracket 5, so that the spherical body 3 is vertically clamped between the receiver recess 5a and the cap 7.

The angle adjusting mechanism 4 and the bracket 5 are accommodated in a mirror housing 10. The mirror housing 10 has an opening in which an anti-glare mirror M is fixedly mounted. The mirror housing 10 includes an upper wall 10a with a hole 10b defined therein for insertion of the stay 1 therethrough, and a lower wall 10c with two holes 10d and a hole 10e defined therein. As shown in FIGS. 1 and 3, the upper wall 10a has a pair of bearing recesses 10f on a lower surface thereof, and the lower wall 10c has a pair of bearing recesses 10g on an upper surface thereof. The mirror housing 10 also includes a rear wall 10h having vertical guides 10i near the holes 10d. The fingers 5f engage in the bearing recesses 10f so that the mirror housing 10 is swingable back and forth with respect to the bracket 5 about the bearing recesses 10f. Since the fingers 5f are disposed on the respective extension arms 5b which extend away from each other in the transverse direction of the bracket 5, the fingers 5f are widely spaced apart from each other, and hence the mirror housing 10 is supported on the bracket 5 at widely spaced positions thereon. As a result, the mirror housing 10 is supported with increased rigidity on the bracket 5. Inasmuch as the spherical body 3 is also widely spaced apart from the fingers 5f, the housing 10 is rigid enough to resist stresses which are applied thereto when the housing 10 is turned about the spherical body 3.

A manipulating member 12 is disposed below the bracket 5. The manipulating member 12 comprises a knob 12a extending downwardly through the hole 10e and a shaft 12b fixed to the upper end of the knob 12a and extending horizontally across the knob 12a. The shaft 12b has a round lower surface 12c held in sliding engagement with the bearing recesses 10g. As shown in FIG. 3, the shaft 12b has two spaced walls 12d on its upper surface, the walls 12d defining a groove 12e therebetween. The groove 12e receives the lower end of a clip spring 14 whose upper end engages the bracket 5. The bearing recesses 10g, the manipulating member 12, and the clip spring 14 jointly serve as a tilting mechanism 16.

When the knob 12a is angularly moved in the directions indicated by the arrows A, B in FIG. 2, the mirror housing 10 is swung with respect to the bracket 5 in the directions indicated by the arrows A, B, moving the mirror M mounted in the mirror housing 10 between a normal position and an anti-glare position.

If the angle of the mirror M is to be varied in the normal position as when the driver is replaced by another driver, the mirror housing 10 is gripped and turned about the spherical body 3. At this time, the force required to turn the mirror housing 10 about the spherical body 3, i.e., the force with which the adjusted angle is kept by the angle adjusting mechanism 4, is determined by the force with which the spherical body 3 is clamped between the receiver recess 5a and the cap 7. Therefore, the force with which the adjusted angle is kept can be varied by turning the bolts b1 to vary the pressure which is applied by the holder plate 8 against the cap 7 in the direction toward the spherical body 3. In the illustrated embodiment, the bolts b1 are turned by a screwdriver inserted through the holes 10d in the lower wall 10c of the mirror housing 10. Since the bolts b1 are turned by a screwdriver from below the mirror housing 10, the force with which the adjusted angle is kept can easily be adjusted.

The guides 10i on the rear wall 10h of the mirror housing 10 serve to guide the screwdriver inserted through the holes 10d reliably toward the bolts b1.

Figure 10:
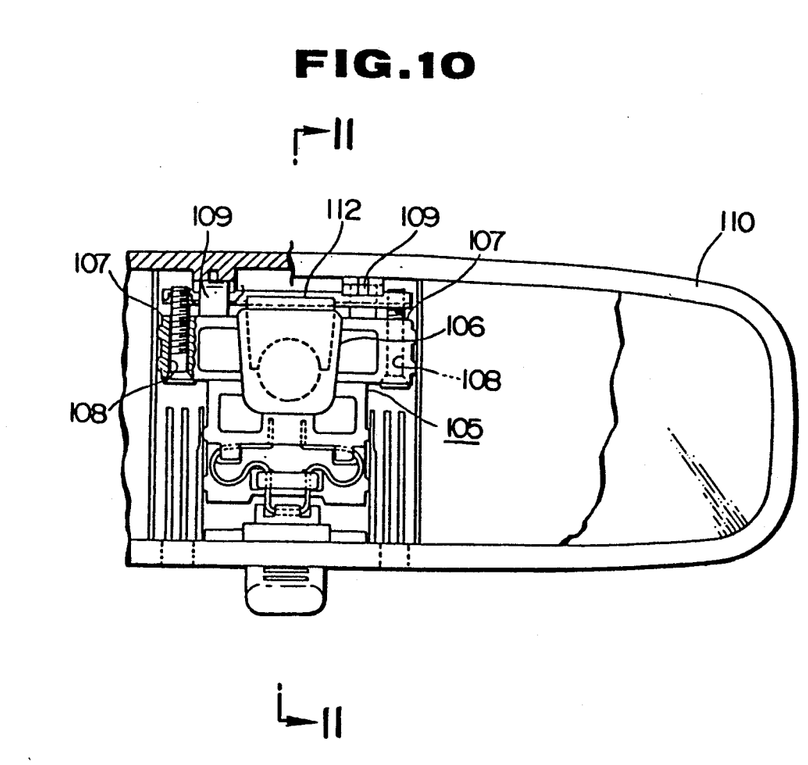
FIG. 10 is a fragmentary front elevational view, partly cut away, of an anti-glare inside rearview mirror assembly according to another embodiment of the present invention.
Figure 11:
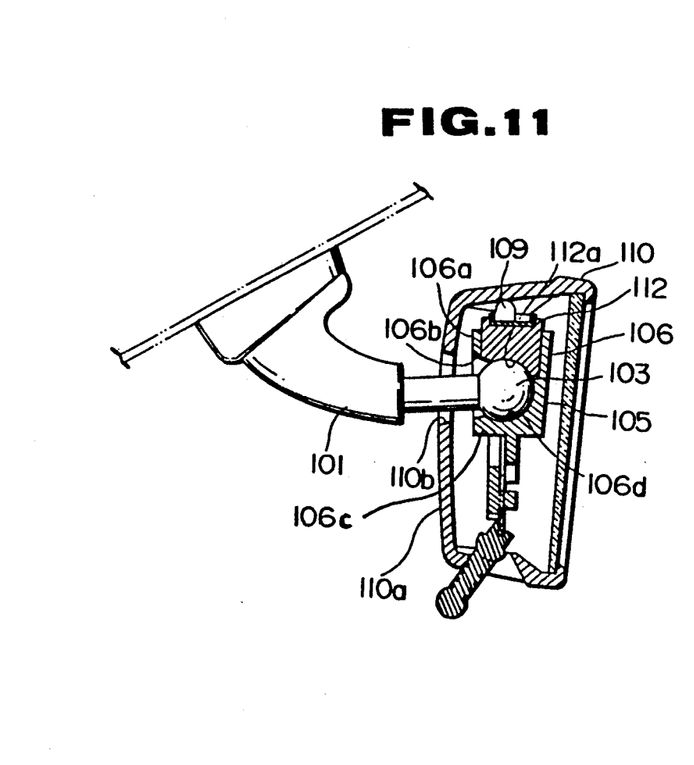
FIG. 11 is a cross-sectional view taken along line 11—11 of FIG. 10.
Figure 12:
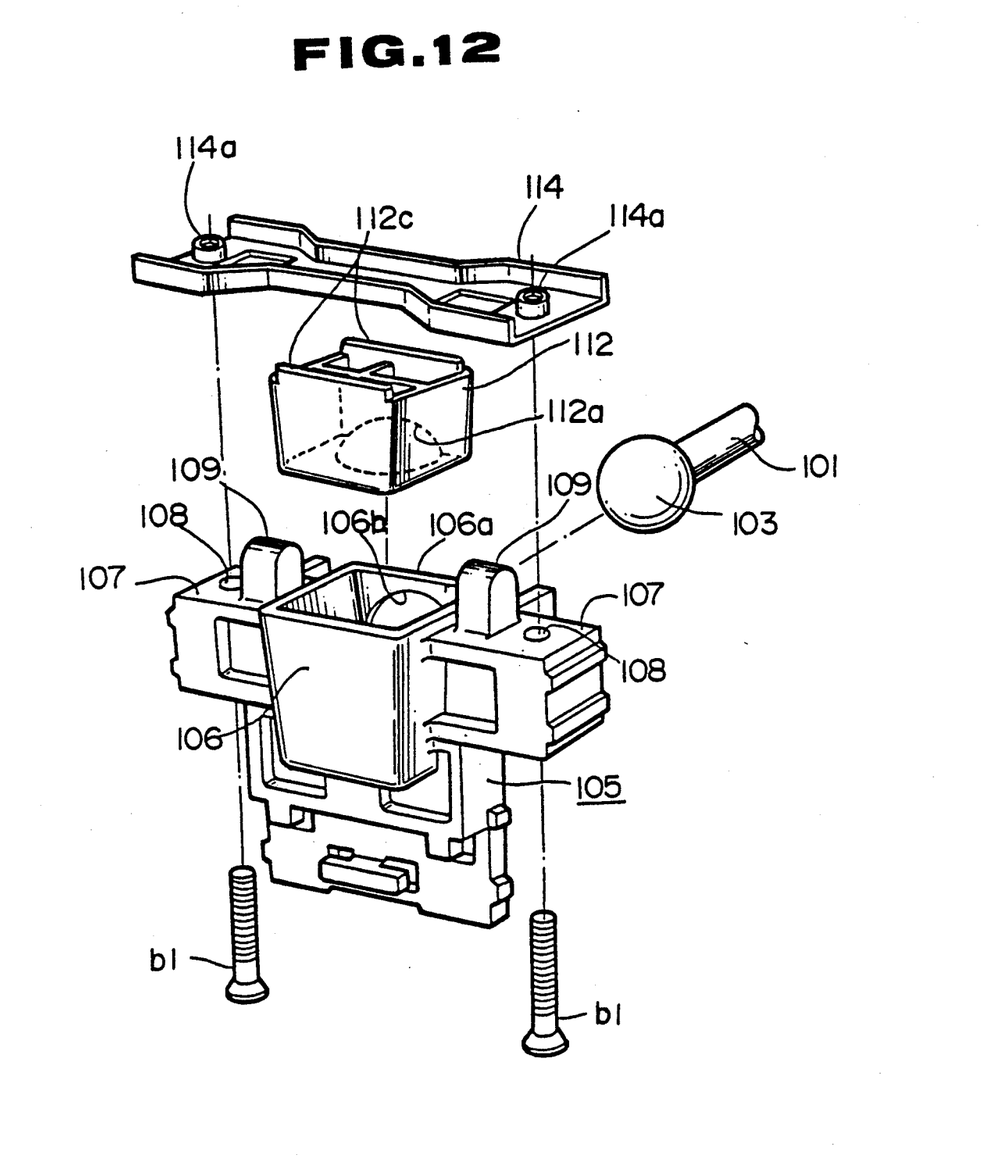
FIG. 12 is a fragmentary exploded perspective view of the anti-glare inside rearview mirror assembly shown in FIG. 10.

FIGS. 10 through 12 show an anti-glare inside rearview mirror assembly according to another embodiment of the present invention.

The anti-glare inside rearview mirror assembly shown in FIG. 10 includes a bracket 105 which has in its upper portion a substantially pyramidal receiver frame 106 whose cross-sectional shape is progressively larger in the upward direction. The receiver frame 106 has a hole 106b defined in its rear wall 106a, and a hemispherical receiver recess 106d defined in an upper surface of a lower wall 106c thereof. The bracket 105 also has a pair of extension arms 107 extending away from each other in the transverse direction thereof across the receiver frame 106. The extension arms 107 have a pair of vertical holes 108 defined respectively therein for insertion of bolts b1 and a pair of fingers 109 projecting upwardly from an upper surface thereof and positioned inwardly of the holes 108.

A stay 101 extends rearwardly from a motor vehicle body or a front windshield and has a distal end portion inserted into a mirror housing 110 through a hole 110b which is defined in a rear wall 110a of the mirror housing 110. A spherical body 103 on the distal end of the stay 101 is inserted in the receiver frame 106 through the hole 106b, and has a lower portion fitted in the receiver recess 106d.

A cap 112 is fitted in an upper opening of the receiver frame 106 and has a hemispherical receiver recess 112a defined in a lower surface thereof. The spherical body 103 has an upper portion fitted in the receiver recess 112a.

A holder plate 114 has a central portion held between and engaging two spaced ridges 112c on the upper end of the cap 112. The bolts b1 are inserted respectively through the holes 108a in the bracket 105, and threaded into respective holes 114a defined in the holder plate 114. When the bolts b1 are turned, the holder plate 114 is moved toward the bracket 105, causing the receiver recesses 106d, 112a to clamp the spherical body 103 therebetween.

The other structural details of the anti-glare inside rearview mirror assembly shown in FIGS. 10 through 12 are the same as those of the anti-glare inside rearview mirror assembly shown in FIGS. 1 through 9.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

I claim:

1. An anti-glare inside rearview mirror assembly for use in a motor vehicle having a motor vehicle body, comprising:

a support adapted to extend from the motor vehicle body and including a spherical body at one end thereof;

bracket means having a recess engaging at least a portion of said spherical body;

clamping means for clamping said spherical body in cooperation with said bracket means;

a housing accommodating said bracket means therein, said housing having an upper wall, a lower wall, an open front wall, and a rear wall;

a mirror mounted in said open front wall of the housing; and angle adjusting means for adjusting the angle of said housing with respect to said bracket;

said clamping means including at least one vertically extending adjustment member for adjusting a force with which said spherical body is clamped by said clamping means in cooperation with said bracket means; and said housing having at least one hole defined in said lower wall in confronting relation to said adjustment member for insertion of a tool vertically therethrough to operatively engage said adjustment member.

2. An anti-glare inside rearview mirror assembly according to claim 1, wherein said spherical body, said clamping means, and said bracket means are fully accommodated in said housing.

3. An anti-glare inside rearview mirror assembly for use in a motor vehicle having a motor vehicle body, comprising:

a support adapted to extend from the motor vehicle body and including a spherical body at one end thereof;

bracket means having a recess engaging at least a portion of said spherical body;

clamping means for clamping said spherical body in cooperation with said bracket means;

a housing accommodating said bracket means therein, said housing having an upper wall, a lower wall, an open front wall, and a rear wall;

a mirror mounted in said open front wall of the housing; and angle adjusting means for adjusting the angle of said housing with respect to said bracket;

said housing having at least one hole defined in said lower wall for insertion of a tool therethrough to adjust the force with which said spherical body is clamped by said clamping means in cooperation with said bracket means; and said clamping means comprises:

an annular cap engaging at least a portion of said spherical body, said annular cap being partly cut off;

at least one bolt inserted through said hole in the lower hole of said housing; and a holder plate having a hole in which said cap is fitted and a threaded hole in which said bolt is threaded.

4. An anti-glare inside rearview mirror assembly according to claim 3, aid housing has a guide on said rear wall of guiding said bolt.

5. An anti-glare inside rearview mirror assembly for use in a motor vehicle having a motor vehicle body, comprising:

a support adapted to extend from the motor vehicle body and including a spherical body at one end thereof;

bracket means having a recess engaging at least a portion of said spherical body;

clamping means for clamping said spherical body in cooperation with said bracket means;

a housing accommodating said bracket means therein, said housing having an upper wall, a lower wall, an open front wall, and a rear wall;

a mirror mounted in said open front wall of the housing; and angle adjusting means for adjusting the angle of said housing with respect to said bracket;

said housing having at least one hole defined in said lower wall for insertion of a tool therethrough to adjust the force with which said spherical body is clamped by said clamping means in cooperation with said bracket means; and wherein said clamping means comprises:

a cap having a recess for engaging a portion of said spherical body;

at least one bolt inserted through said hole in the lower wall of said housing; and a holder plate having a portion securely engaging said cap and a threaded hole in which said bolt is threaded.

6. An anti-glare inside rearview mirror assembly according to claim 5, wherein said housing has a guide on said rear wall for guiding said bolt.

* * * * *